US011261396B2

(12) United States Patent
Low et al.

(10) Patent No.: US 11,261,396 B2
(45) Date of Patent: Mar. 1, 2022

(54) HEAT TRANSFER COMPOSITION

(71) Applicant: MEXICHEM FLUOR S.A. DE C.V., San Luis Potosi (MX)

(72) Inventors: Robert Elliot Low, Runcorn (GB); Andrew Paul Sharratt, Runcorn (GB); Emma Jane Hodgson, Stoke-on-Trent (GB)

(73) Assignee: MEXICHEM FLUOR S.A. DE C.V., San Luis Potosi (MX)

( * ) Notice: Subject to any disclaimer, the term of this patent is extended or adjusted under 35 U.S.C. 154(b) by 0 days.

(21) Appl. No.: 16/859,212

(22) Filed: Apr. 27, 2020

(65) Prior Publication Data

US 2020/0255761 A1 Aug. 13, 2020

Related U.S. Application Data

(63) Continuation of application No. 15/781,420, filed as application No. PCT/GB2016/053850 on Dec. 7, 2016, now abandoned.

(30) Foreign Application Priority Data

Dec. 7, 2015 (GB) ..................................... 1521507

(51) Int. Cl.
| | | |
|---|---|---|
| C10M 107/38 | (2006.01) | |
| C10M 171/00 | (2006.01) | |
| C09K 5/04 | (2006.01) | |
| C09K 21/02 | (2006.01) | |
| C09K 21/08 | (2006.01) | |
| C09K 21/10 | (2006.01) | |
| C09K 21/12 | (2006.01) | |
| C09K 21/14 | (2006.01) | |
| C10N 10/06 | (2006.01) | |
| C10N 10/10 | (2006.01) | |
| C10N 20/02 | (2006.01) | |
| C10N 20/00 | (2006.01) | |
| C10N 30/08 | (2006.01) | |
| C10N 40/30 | (2006.01) | |

(52) U.S. Cl.
CPC ........... *C10M 107/38* (2013.01); *C09K 5/045* (2013.01); *C09K 21/02* (2013.01); *C09K 21/08* (2013.01); *C09K 21/10* (2013.01); *C09K 21/12* (2013.01); *C09K 21/14* (2013.01); *C10M 171/008* (2013.01); *C09K 2205/126* (2013.01); *C10M 2203/024* (2013.01); *C10M 2207/026* (2013.01); *C10M 2207/042* (2013.01); *C10M 2211/02* (2013.01); *C10M 2211/06* (2013.01); *C10M 2213/02* (2013.01); *C10M 2213/043* (2013.01); *C10M 2213/0606* (2013.01); *C10M 2223/04* (2013.01); *C10M 2223/043* (2013.01); *C10N 2010/06* (2013.01); *C10N 2010/10* (2013.01); *C10N 2020/02* (2013.01); *C10N 2020/099* (2020.05); *C10N 2020/101* (2020.05); *C10N 2020/103* (2020.05); *C10N 2030/08* (2013.01); *C10N 2040/30* (2013.01)

(58) Field of Classification Search
CPC .......... C10M 107/38; C10M 2203/024; C10M 2207/026; C10M 2207/042; C10M 2211/02; C10M 2211/06; C10M 2213/02; C10M 2213/043; C10M 2213/0606; C10M 2223/04; C10M 2223/043; C10M 171/008; C10N 2010/06; C09K 5/045; C09K 21/02; C09K 21/08; C09K 21/10; C09K 21/12; C09K 21/14
See application file for complete search history.

(56) References Cited

U.S. PATENT DOCUMENTS

| | | |
|---|---|---|
| 5,100,569 A | 3/1992 | Nalewajek et al. |
| 5,858,266 A | 1/1999 | Kaneko |
| 5,997,761 A | 12/1999 | Kaneko |
| 8,894,874 B2 | 11/2014 | Low |
| 9,365,760 B2 | 6/2016 | Saito et al. |

(Continued)

FOREIGN PATENT DOCUMENTS

| | | |
|---|---|---|
| JP | H 0726279 A | 1/1995 |
| JP | 2013-503230 A | 1/2013 |
| WO | WO 87/02993 | 5/1987 |
| WO | WO 90/13583 | 11/1990 |
| WO | WO 92/08774 | 5/1992 |
| WO | WO 96/11246 A1 | 4/1996 |
| WO | WO 2005/049760 | 6/2005 |
| WO | WO 2014/112417 A1 | 7/2014 |
| WO | WO 2014/172272 A1 | 10/2014 |

(Continued)

OTHER PUBLICATIONS

P. Jannasch, Preparation and characterisation of aggregating comblike poly(propylene oxide, Polymer 41 (2000) 6701-6707 (Year: 2000).*

(Continued)

*Primary Examiner* — Bijan Ahvazi
(74) *Attorney, Agent, or Firm* — Crowell & Moring LLP; Yuezhong Feng

(57) ABSTRACT

A composition comprising a heat transfer portion and a lubricating portion, wherein the lubricating portion comprises one or more compounds according to formula (I): wherein W is independently selected from the group consisting of H, F, Cl, Br and I; Y is independently selected from the group consisting of F, Cl, Br and I; Z is independently selected from the group consisting of H, OH, $(CW_2)_pCW_3$, $CY_3$, $OCW_3$, $O(CW_2)_pCW_3$, $OCW((CY_2)_mCY_3)CWCW_2$, polyalkylene glycol and polyolester; n is an integer from 2 to 250; m is an integer from 0 to 3; and p is an integer from 0 to 9.

24 Claims, No Drawings

(56) References Cited

U.S. PATENT DOCUMENTS 10,101,065 B2    10/2018   Nishiguchi et al.
2012/0126187 A1*   5/2012   Low .................... C11D 7/5009
                                                                                                          252/602

FOREIGN PATENT DOCUMENTS

WO     WO-2014172272 A1 *   10/2014   ............... C09K 5/04
WO     WO 2015/022958 A1     2/2015

OTHER PUBLICATIONS

International Search Report and Written Opinion for International Application No. PCT/GB2016/053850, 9 pages (dated Mar. 17, 2017).

* cited by examiner

HEAT TRANSFER COMPOSITION

REFERENCE TO EARLIER FILED APPLICATIONS

This application is a continuation of U.S. patent application Ser. No. 15/781,420, filed Jun. 4, 2018, which is a 371 national phase of International Application No. PCT/GB2016/053850, filed Dec. 7, 2016, which claims priority to GB Application No. 1521507.2, filed Dec. 7, 2015, the disclosures of all of which are incorporated, in their entirety, by this reference.

TECHNICAL FIELD OF THE INVENTION

The present invention relates to compositions, uses thereof and methods for preparing the same, wherein the composition comprises a heat transfer portion and a lubricating portion, wherein the lubricating portion comprises a halogenated polyether.

BACKGROUND OF THE INVENTION

The listing or discussion of a prior-published document in this specification should not necessarily be taken as an acknowledgement that the document is part of the state of the art or is common general knowledge.

Fluorocarbon-based compounds are currently used in a large number of commercial and industrial applications, such as propellants, blowing agents and heat transfer fluids. The interest in and use of fluorine-based compounds, particularly (hydro)fluoroolefins, as heat transfer fluids has increased as new refrigerants are sought.

Dichlorodifluoromethane (refrigerant R-12) possesses a suitable combination of refrigerant properties and was, for many years, the most widely used refrigerant, Due to international concern that fully and partially halogenated chlorofluorocarbons, such as dichlorodifluoromethane and chlorodifluoromethane, were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out. R-410A and R-407 (including R-407A, R-407B and R-407C) have been introduced as a replacement refrigerant for R-22, However, R-22, R-410A and the R-407 refrigerants all have a high global warming potential (GWP, also known as greenhouse warming potential).

1,1,1,2-tetrafluoroethane (refrigerant R-134a) was introduced as a replacement refrigerant for R-12. However, despite having a low ozone depletion potential, R-134a has a GWP of 1430. It would be desirable to find replacements for R-134a that have a lower GWP.

R-152a (1,1-difluoroethane) has been identified as an alternative to R-134a. It is somewhat more efficient than R-134a and has a greenhouse warming potential of 120. However the flammability of R-152a is judged too high, for example to permit its safe use in mobile air conditioning systems. In particular its lower flammable limit in air is too low, its flame speeds are too high, and its ignition energy is too low.

(Hydro)fluoroolefins, particularly tetrafluoropropenes, have been proposed as possible refrigerants for use in a variety of heat transfer devices.

Heat transfer fluids are often used in combination with lubricants, such as in heating and refrigeration systems. Such lubricants are included in heat transfer compositions to ensure continued smooth operation of the heat transfer system.

It is necessary that lubricants used in heat transfer compositions are compatible with the refrigerants in the compositions. The compatibility of the lubricant and the refrigerant is predicated on a number of factors, such as a desire for at least partial miscibility at part of the operating temperature range, a low tendency to degrade or react in use and appropriate viscosities for the application.

There is, therefore, a need for lubricants that can be used in conjunction with heat transfer fluids, both those currently used and those proposed as replacement compositions. In particular, lubricants are desired that are miscible with a wide range of heat transfer fluids, possess an appropriate viscosity, do not reduce the performance of heat transfer fluids and have low flammability; all in addition to successfully functioning as a lubricant.

Lubricants with low flammability are particularly important for heat transfer fluids that are used in automobile air-conditioning, as such compositions are in danger of coming into contact with hot metal surfaces of the engine.

DETAILED DESCRIPTION

The subject invention addresses the above and other deficiencies by the provision of a composition comprising a heat transfer portion and a lubricating portion, wherein the lubricating portion comprises a compound according to formula (I):

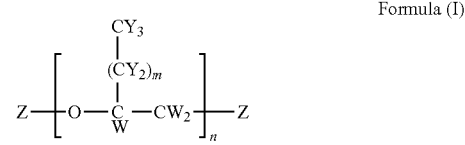

Formula (I)

wherein

W is independently selected from the group consisting of H, F, Cl, Br and I;

Y is independently selected from the group consisting of F, Cl, Br and I;

Z is independently selected from the group consisting of H, OH, $(CW_2)_pCW_3$, $CY_3$, $OCW_3$, $O(CW_2)_pCW_3$, $OCW((CY_2)_mCY_3)CWCW_2$, polyalkylene glycol and polyester;

n is an integer from 2 to 250;

m is an integer from 0 to 3; and p is an integer from 0 to 9.

Such lubricants show excellent resistance to ignition, including when exposed to hot surfaces.

Also provided by the invention is the use of such compositions described above as lubricants, for example, in heat transfer applications.

Further provided by the invention are methods of preparing such compositions described above.

Compositions of the Invention

In one aspect, the invention provides a composition comprising a heat transfer portion and a lubricating portion, wherein the lubricating portion comprises a compound according to formula (I):

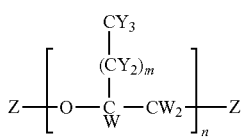

Formula (I)

wherein
W is independently selected from the group consisting of H, F, Cl, Br and I;
Y is independently selected from the group consisting of F, Cl, Br and I;
Z is independently selected from the group consisting of H, OH, $(CW_2)_pCW_3$, $CY_3$, $OCW_3$, $O(CW_2)_pCW_3$, $OCW((CY_2)_mCY_3)CWCW_2$, polyalkylene glycol and polyester;
n is an integer from 2 to 250;
m is an integer from 0 to 3; and
p is an integer from 0 to 9.

In an embodiment, Y is F or Cl, preferably F. W may be H, F or Cl. Preferably, W is H. Advantageously, m is an integer from 0 to 3, preferably 0 and n is an integer from 2 to 100, for example from 5 to 20, preferably n is an integer from 10 to 20, e.g. 10, 11, 12, 13, 14, 15, 16, 17, 18, 19 or 20.

Such lubricant/heat transfer component compositions show low flammability, such as when sprayed onto hot surfaces or sprayed through a flame.

In an embodiment at least one of the Z derivatives is OH. Preferably, both Z derivatives are OH.

In another embodiment, at least one Z derivative may comprise a polyalkylene glycol. Alternatively, both Z derivatives may comprise a polyalkylene glycol (PAG). In both instances, the polyalkylene glycol may be selected from the group consisting of polyethylene oxide) and poly (propylene oxide), and mixtures thereof. In such embodiments, the PAG groups may be conjugated to the compound of formula (I) through the formation of an ester bond between a hydroxyl end-capping group of formula (I) (i.e., Z=OH) with a carboxylic acid end-capped PAG.

In a further embodiment, the Z derivatives may, independently, be an alkyl or alkoxy group containing from 1 to 10 carbon atoms.

In an embodiment, both Z derivatives may be the same. Alternatively, both Z derivatives may be different.

In an embodiment, the weight percentage of the lubricating portion in the total composition of the invention is 1-30%, preferably 1-10%, more preferably 1-5%.

In an embodiment of the invention, the compound of formula (I) is a compound of formula (II):

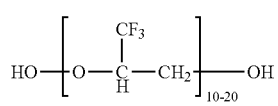

Formula (II)

In an alternative embodiment of the invention, the compound of formula (I) is a compound of formula (III):

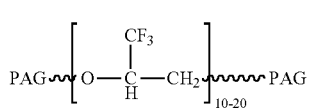

Formula (III)

In an embodiment of the invention, the PAG group of Formula (III) is connected to the polymer backbone via an ester linkage. In another embodiment of the invention, the PAG group of Formula (III) is connected to the polymer backbone via an ether linkage.

In an embodiment of the invention, the composition may comprise at least two different compounds of formula (I). In such instances, the value of n may be the same for the at least two compounds of formula (I). Alternatively, the value of n may be different for the at least two compounds of formula (I).

In an embodiment of the invention, the lubricating portion of the composition may have a kinematic viscosity of from about 5 to about 250 cSt at 40° C. Advantageously, the lubricating portion has a kinematic viscosity of from about 20 to about 100 cSt at 40° C., such as from about 30 to about 70 cSt, for example, from about 30 to about 60 cSt.

Preferably, the heat transfer portion comprises one or more compounds selected from the group of (hydro)fluoroolefins (HFOs), hydrofluorocarbons (HFCs), chlorofluorocarbons (CFCs), hydrochlorofluorocarbons (HCFCs) and hydrocarbons.

Advantageously, the heat transfer portion may comprise one or more compounds selected from the group of 1,3,3, 3-tetrafluoropropene (R-1234ze), 2,3,3,3-tetrafluoropropene (R-1234yf), 3,3,3-trifluoropropene (R-1243zf), 1,1,1,2-tetrafluoroethane (R-134a), 1,1-difluoroethane (R-152a), difluoromethane (R-32), fluoroethane (R-161), pentafluoroethane (R-125), 1,1,2,2-tetrafluoroethane (R-134), propane, propylene, carbon dioxide, 1,1,1,3,3-pentafluoropropane (R-245fa), 1,1,1,3,3,3-hexafluoropropane (R-236fa), 1,1,1, 2,3,3,3-heptafluoropropane (R-227ea), 1,1,1-trifluoroethane (R-143a), n-butane, iso-butane and 1,1,1,3,3-pentafluorobutane (R-365mfc), 1,1,2-trifluoroethylene (R-1123), 1,1-difluoroethylene (R-1132a), 1,1,1,4,4,4-hexafluorobutene (R1336mzz), such as R-1234ze, R-1234yf, R-1243zf, R-134a, R-152a and R-32.

For the avoidance of doubt, it is to be understood that where a compound may exist as one of two configurational isomers, e.g. cis and trans isomers around a double bond, the use of the term without an isomer designation (e.g. R-1234ze) is to refer to either isomer.

Conveniently, the heat transfer portion comprises tetrafluoropropenes. Preferably, the heat transfer portion comprises R-1234ze, even more preferably the heat transfer portion comprises R-1234ze(E). Advantageously, the heat transfer composition comprises R-1234yf.

Advantageously, compositions of the invention are less flammable than a composition comprising the same heat transfer portion combined with a polyalkylene glycol (PAG) and/or a polyol ester (POE) based lubricant.

In an embodiment, the composition of the invention is miscible with existing polyalkylene glycol, polyalkylene glycol ester and polyol ester lubricating oils.

In an embodiment, the compounds comprising the lubricating portion comprise carbon, hydrogen and oxygen, with a ratio of oxygen to carbon sufficient to provide a degree of miscibility with the heat transfer portion, such as when the lubricating portion is added to the heat transfer portion in a proportion of from about 1 to 30 wt %, preferably 1 to 10 wt % and even more preferably 1 to 5 wt % of the total composition, the mixture has one liquid phase. Preferably, the mixture has one liquid phase when 1 to 20 wt % of the lubricating portion is present in the composition. Even more preferably, the composition is one liquid phase regardless of the proportions of the heat transfer portion to the lubricating portion. This solubility or miscibility preferably exists at all normal operating temperatures. For example, the solubility or miscibility exists at least one temperature between −100° C. and +100° C., preferably at least one temperature between −75° C. and +75° C. and even more preferably, at least one temperature between −50° C. and +50° C. Advantageously, the solubility or miscibility exists over all temperature ranges wherein the composition is in the liquid phase.

Conveniently, the compositions of the invention are less flammable than the heat transfer portion alone.

Preferably, the composition of the invention has a lowest temperature of ignition of about 500° C. or greater, such as 510° C., 520° C., 530° C., 540° C., 550° C., 560° C., 570° C., 580° C., 590° C., preferably about 600° C. or greater, for example 610° C., 620° C., 630° C. or 640° C.

In an embodiment, the composition of the invention may be non-flammable.

Flammability may be determined in accordance with ASHRAE Standard 34 incorporating the ASTM Standard E-681 with test methodology as per Addendum 34p dated 2004, the entire content of which is incorporated herein by reference.

Conveniently, the Global Warming Potential (GWP) of the compositions of the invention may be less than about 3500, 3000, 2500 or 2000. For instance, the GWP may be less than 2500, 2400, 2300, 2200, 2100, 2000, 1900, 1800, 1700, 1600 or 1500. The GWP of the compositions of the invention preferably is less than 1400, 1300, 1200, 1100, 1000, 900, 800, 700, 600 or 500.

Preferably, the compositions of the invention have zero or near zero ozone depletion.

In an embodiment, the compositions of the invention have improved heat transfer properties than the heat transfer fluid alone.

Without wishing to be bound by theory, it is believed that compounds of formula (I) may further act as heat transfer agents and therefore increase the heat transfer properties of the compositions of the invention.

Advantageously, the composition further comprises a stabiliser.

Preferably the stabiliser is selected from group consisting of diene-based compounds, phosphates, phenol compounds and epoxides, and mixtures thereof.

Conveniently, the composition further comprises an additional flame retardant.

Preferably, the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

In an embodiment, the composition of the invention may be comprised within a lubricant composition in a proportion of at least 10 to 90 wt %, preferably in a proportion of 10 to 75 wt %, such as 10, 20, 30, 40 or 50 wt %.

The invention also provides a heat transfer device containing a composition of the invention and/or the use of a composition of the invention in a heat transfer device.

In an embodiment, the heat transfer device is a refrigeration device.

Conveniently, the heat transfer device is selected from the group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

Preferably, the heat transfer device contains a compressor.

According to a further aspect of the invention, there is provided a method of cooling an article, which comprises condensing a composition of the invention and thereafter evaporating the composition in the vicinity of the article to be cooled.

According to an another aspect of the invention, there is provided a method for heating an article, which comprises condensing a composition of the invention in the vicinity of the article to be heated and thereafter evaporating the composition.

According to a further aspect of the invention, there is provided a mechanical power generation device containing a composition of the invention.

Preferably, the mechanical power generating device is adapted to use a Rankine Cycle or modification thereof to generate work from heat.

According to another aspect of the invention, there is provided a method of retrofitting a heat transfer device comprising the step of removing an existing heat transfer fluid and introducing a composition of the invention. Preferably, the heat transfer device is a refrigeration device. Advantageously, the heat transfer device is an air-conditioning system.

According to a further aspect of the invention, there is provided a method of reducing the flammability of a composition by the addition of a composition of the invention.

Methods of Preparation of Compositions of the Invention

Compositions of the invention may be prepared by mixing one or more compounds of formula (I) with a heat transfer fluid.

Preferably, the heat transfer fluid comprises one or more compounds selected from the group of (hydro)fluoroolefins (HFOs), hydrofluorocarbons (HFCs), chlorofluorocarbons (CFCs), hydrochlorofluorocarbons (HCFCs) and hydrocarbons.

Advantageously, the heat transfer fluid comprises one or more compounds selected from the group of R-1234ze, R-1234yf, R-1243zf, R-134a, R-152a, R-32, R-161, R-125, R-134, propane, propylene, carbon dioxide, R-245fa, R-236fa, R-227ea, R-143a, R-1123, R-1132a, R1336mzz, n-butane, iso-butane and R-365mfc.

Conveniently, wherein the heat transfer fluid comprises one or more compounds selected from the group of R-1234ze, R-1234yf, R-1243zf, R-134a, R-152a and R-32.

Preferably, the heat transfer fluid comprises R-1234ze.

Preferably, the heat transfer fluid comprises R-1234yf.

Uses of the Composition of the Invention

In an aspect, the composition of the invention may be used as a heat transfer agent. In an embodiment, when used as a heat transfer agent, the compositions of the invention may comprise at least two compounds according to formula (I).

In another aspect, the compositions of the inventions may be used as lubricants. In an embodiment, the lubricant composition may comprise at least two compounds according to formula (I).

The use of effective amounts of compounds according to formula (I) in a lubricant composition or a heat transfer composition is advantageous due to their thermal and mechanical stability, lubricity, viscosity, pour point, anti-oxidation and anti-corrosive properties.

EXAMPLE

A compound according to the invention was synthesised by the following method. A 450 mL Parr reactor was placed in an inert atmosphere inside a glove-box and 150 mL of 1,2-dimethoxyethane was added. 50 g (0.45 mol) of 3,3,3-trifluoropropylene oxide was then added along with 1.3 g (0.012 mol) of potassium ted-butoxide. The reactor was then sealed, removed from the glove-box and connected to a stirrer. The reactor contents were then stirred and heated to 90° C. for 5 days. The contents were then cooled and quenched with 200 mL of water. The resulting polytrifluoropropylene oxide (PTFO) was extracted with diethyl ether and dried over a rotary evaporator.

The PTFO was tested to assess its flammability and/or combustibility alone and mixed with fluorocarbon refrigerant compositions. It was found that the fluorinated species exhibited elevated combustion temperature compared to commercially available polyalkylene glycol (PAG) and polyol ester (POE) lubricant materials.

Hot Manifold Testing

An assessment was made of the ease of ignition of the fluids when in contact with a hot metal surface, using the test apparatus and test method as described in ISO Standard ISO 20823:2003. In this test droplets of the fluid were allowed to fall vertically downwards onto an internally heated, cylindrical hot surface, inclined at a shallow angle to the horizontal, and which was additionally fitted with a horizontal gutter to trap liquid at one side of the cylindrical body. (The surface is hereinafter described as the "manifold").

The temperature of the manifold was increased stepwise until ignition was observed. Observations on the character and vigour of ignition were also recorded during each test, Five fluids of the invention, two PAG type lubricants (Nippon Denso ND12 and Daphne FD46XG, Comparative Examples 1 and 2, respectively) and one POE lubricant (Emkarate RL68H, comparative Example 3) were tested. A perfluorinated lubricant material (DuPont Krytox™ GPL 50) was also tested as a comparative example. The results are tabulated below.

| Fluid | Highest temperature without ignition (° C.) | Lowest temperature with ignition (° C.) | Observations |
|---|---|---|---|
| Example | 676 | — | No sustained ignition found, though some brief flame flashes were observed on hot surface |
| Comparative Example 1 | 438 | 443 | Immediate ignition; burning liquid collected |
| Comparative Example 2 | 462 | 467 | Immediate ignition; burning liquid collected |

| Fluid | Highest temperature without ignition (° C.) | Lowest temperature with ignition (° C.) | Observations |
|---|---|---|---|
| Comparative Example 3 | 628 | 633 | Immediate ignition; gas above tray also ignited by droplets |

The results clearly show a significant improvement in ignition resistance offered by compounds according to the invention over conventional lubricants used in refrigeration technologies.

Preferences and options for a given aspect, feature or parameter of the invention should, unless the context indicates otherwise, be regarded as having been disclosed in combination with any and all preferences and options for all other aspects, features and parameters of the invention.

Where a molecule, for example HFO-1234ze, may take the form of E and Z isomers, the general disclosure of that molecule is intended to refer equally to both the E and Z isomers.

The invention is defined by the following claims.

The invention claimed is:

1. A composition comprising a heat transfer portion and a lubricating portion, wherein at least 20 wt % of the lubricating portion comprises one or more compounds according to formula (I):

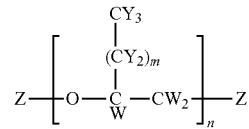

Formula (I)

wherein
W is H;
Y is independently selected from the group consisting of F, Cl, Br, and I;
Z is independently selected from the group consisting of H, OH, $(CW_2)_pCW_3$, $CY_3$, $OCW_3$, $O(CW_2)_pCW_3$, $OCW((CY_2)_mCY_3)CWCW_2$, polyalkylene glycol, and polyolester;
n is an integer from 2 to 250;
m is an integer from 0 to 3; and
p is an integer from 0 to 9,
wherein the composition comprises at least two different compounds of formula (I),
wherein the lubricating portion has a kinematic viscosity at 40° C. of from about 20 to 100 cSt,
wherein the composition has an ignition temperature of about 500° C. or greater, and
wherein the composition is non-flammable.

2. The composition according to claim 1, wherein Y is F or Cl.

3. The composition according to claim 1, wherein n is an integer from 2 to 100.

4. The composition according to claim 1, wherein m is 0.

5. The composition according to claim 1, wherein p is 1 to 6.

6. The composition according to claim 1, wherein Z is OH or comprises a polyalkylene glycol.

7. The composition according to claim 6, wherein the polyalkylene glycol is selected from the group consisting of poly(ethylene oxide), poly(propylene oxide), and mixtures thereof.

8. The composition according to claim 1, wherein at least one of the Z derivatives are not H or OH.

9. The composition according to claim 1, wherein the weight percentage of the lubricating portion in the composition is 1 to 30%.

10. The composition according to claim 1, wherein the heat transfer portion comprises one or more compounds selected from the group consisting of (hydro)fluoroolefins (HFOs), hydrofluorocarbons (HFCs), chlorofluorocarbons (CFCs), hydrochlorofluorocarbons (HCFCs), and hydrocarbons.

11. The composition according to claim 1, wherein the heat transfer portion comprises one or more compounds selected from the group consisting of R-1234ze, R-1234yf, R-1243zf, R-134a, R-152a, R-32, R-161, R-125, R-134, propane, propylene, carbon dioxide, R-245fa, R-236fa, R-227ea, R-143a, n-butane, iso-butane, R-365mfc, R-1123, R-1132a, and R1336mzz.

12. The composition according to claim 1, which is less flammable than the heat transfer fluid alone.

13. The composition according to claim 1, further comprising a stabiliser and/or a flame retardant.

14. The composition according to claim 13, wherein the stabiliser is selected from the group consisting of diene-based compounds, phosphates, phenol compounds and epoxides, and mixtures thereof.

15. The composition according to claim 13, wherein the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines, and mixtures thereof.

16. A heat transfer device containing a composition as defined in claim 1.

17. The heat transfer device according to claim 16, which is selected from the group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

18. A method of cooling an article, which comprises condensing a composition as defined in claim 1 and thereafter evaporating the composition in the vicinity of the article to be cooled.

19. A method for heating an article, which comprises condensing a composition as defined in claim 1 in the vicinity of the article to be heated and thereafter evaporating the composition.

20. A mechanical power generation device containing a composition as defined in claim 1.

21. The mechanical power generating device according to claim 20, which is adapted to use a Rankine Cycle or modification thereof to generate work from heat.

22. A method of retrofitting a heat transfer device comprising the step of removing an existing heat transfer fluid and introducing a composition as defined in claim 1.

23. The method according to claim 22 wherein the heat transfer device is a refrigeration device.

24. The method according to claim 23 wherein the heat transfer device is an air-conditioning system.

* * * * *